Patented Sept. 27, 1927.

1,643,663

UNITED STATES PATENT OFFICE.

FRITZ KLATTE AND JULIUS SÖLL, OF SCHWANHEIM-ON-THE-MAIN, GERMANY, ASSIGNORS TO I. G. FARBENINDUSTRIE AKTIENGESELLSCHAFT, OF FRANKFORT, GERMANY.

PRODUCTION OF METHANE.

No Drawing. Application filed November 30, 1925, Serial No. 72,402, and in Germany December 3, 1924.

Our invention refers to the production of methane, more particularly from a gaseous mixture containing carbon monoxide and hydrogen in the presence of a catalyst or contact substance containing nickel or a nickel compound. It is an object of our invention to provide means whereby the velocity of reaction is increased and in consequence thereof the time required for producing a predetermined quantity of methane is reduced and smaller apparatus and smaller quantities of contact substances are required.

In the production of methane, as hitherto practiced, from a gaseous mixture containing carbon monoxide and hydrogen in the presence of nickel catalysts the temperature has not been raised materially beyond 300° C. The publications relating to this method contain warnings to the effect that the contact substances should not be heated above this temperature in order to prevent decomposition with separation of carbon.

We have now ascertained the surprising fact that it is by no means necessary to keep the temperature at 300° or thereabouts. We have found by experiment that the temperature in the contact substances can be raised above 500° and above without the output of methane being lowered or a separation of carbon taking place. We have even ascertained that the catalyst can be heated to incandescence without the smooth quantitative conversion of carbon monoxide into methane being impaired. It is merely necessary to correctly adjust the velocity of flow of the gas mixture and to remove the remaining gas from the hot zone of reaction with sufficient speed. Obviously the novel method entails a great technical advance inasmuch as in consequence of the higher temperature employed the speed of reaction is increased many times whereby a predetermined quantity of methane is produced in less time and in materially smaller contact kilns and with a smaller quantity of contact substances than was hitherto possible. Moreover the control of operations is greatly facilitated by the fact that it is no more necessary to so carefully regulate the temperature in order to prevent it from rising too high. In consequence thereof the practice of the process is greatly simplified.

The process according to this invention is adapted for use in the production of methane by simply passing the gas mixture over one or a plurality of catalysts arranged in series as well as for the production in a cyclic process.

*Example 1.*

1 ccm. of an active nickel catalyst prepared in any well known manner and located in a U-shaped glass tube of about 4 mms. diameter is pre-heated in the tube to 250°–300° C. in an air or metal bath and a mixture containing 20% carbon monoxide and 80% hydrogen is passed over the catalyst at a velocity such that the contact is partly heated to a dull red heat. This small quantity of catalyst will activate more than 20 L. of the gas mixture per hour without any secondary reactions taking place and without any carbon being traceable in the catalyst.

*Example 2.*

With the aid of a nickel catalyst as described with reference to Example 1 from an initial gas mixture containing 15% carbon monoxide, 25% methane and 60% hydrogen and flowing at the rate of 30 L. per hour there is obtained a gas containing more than 70% methane, the temperature of the contact substance being again kept at dull red heat corresponding to more than 550° C. No carbon could be traced in the contact substance and the output of methane was not lower as if the operation was carried through at 300° C.

*Example 3.*

In operating in a closed cycle the percentage of carbon monoxide in the gas about to pass over the contact substance is so regulated that a gas containing about 35% methane escapes from the apparatus, the temperature being raised above 500° C. without any decomposition, separation of carbon or other injury to the contact substance being experienced.

We wish it to be understood that we do not desire to be limited to the exact substances, proportions, temperatures and sequence of operations described, for obvious modifications will occur to a person skilled in the art.

We claim:—

The process of producing methane comprising acting on a current of gases containing carbon monoxide and hydrogen with a nickel catalyst at a temperature above 500° C., the velocity of flow of the gases past the catalyst being regulated so as to avoid the separation of carbon and to provide for a quick removal of the gases treated from the hot zone of reaction.

In testimony whereof we affix our signatures.

FRITZ KLATTE.
JULIUS SÖLL.